United States Patent

[11] 3,548,866

| [72] | Inventors | Willard D. Kaiser<br>Grove City;<br>John A. Kasuba, Columbus, Ohio |
|---|---|---|
| [21] | Appl. No. | 740,163 |
| [22] | Filed | June 26, 1968 |
| [45] | Patented | Dec. 22, 1970 |
| [73] | Assignee | Houdaille Industries, Inc.<br>Buffalo, N.Y.<br>a corporation of Delaware |

[54] SERVO-CONTROLLED HIGH PRESSURE RELIEF VALVE
6 Claims, 1 Drawing Fig.

[52] U.S. Cl. ............................................. 137/487.5, 137/489.5
[51] Int. Cl. ..................................................... F16k 17/02
[50] Field of Search ........................................... 137/488, 492, 487.5; 137/108, 491, 529, 496, 467; 251/75

[56] References Cited
UNITED STATES PATENTS
| 2,881,792 | 4/1959 | Spence | 137/489.5 |
| 3,294,111 | 12/1966 | Abercombie et al. | 137/492 |
| 3,389,718 | 6/1968 | Johnson et al. | 137/492.5 |
| 1,039,639 | 9/1912 | Bodwin | 137/492 |
| 3,015,768 | 1/1962 | Hornfeck et al. | 137/487.5X |
| 3,068,387 | 12/1962 | Koppel | 137/487.5X |
| 3,308,846 | 3/1967 | Yuile | 137/487.5 |

Primary Examiner—M. Cary Nelson
Assistant Examiner—Robert J. Miller
Attorney—Hill, Sherman, Meroni, Gross & Simpson ABSTRACT: A servo-controlled conical valve which uses pressure feedback to operate the valve as a pressure relief valve. The device consists of a pressure transducer to sense the pressure, amplifiers and compensation circuits, and a reference voltage source which is used to preset the desired operating pressure of the valve. A servovalve and manifold are used to control the flow of fluid to a hydraulic cylinder which, in turn, is used to operate the conical valve of the pressure relief device.

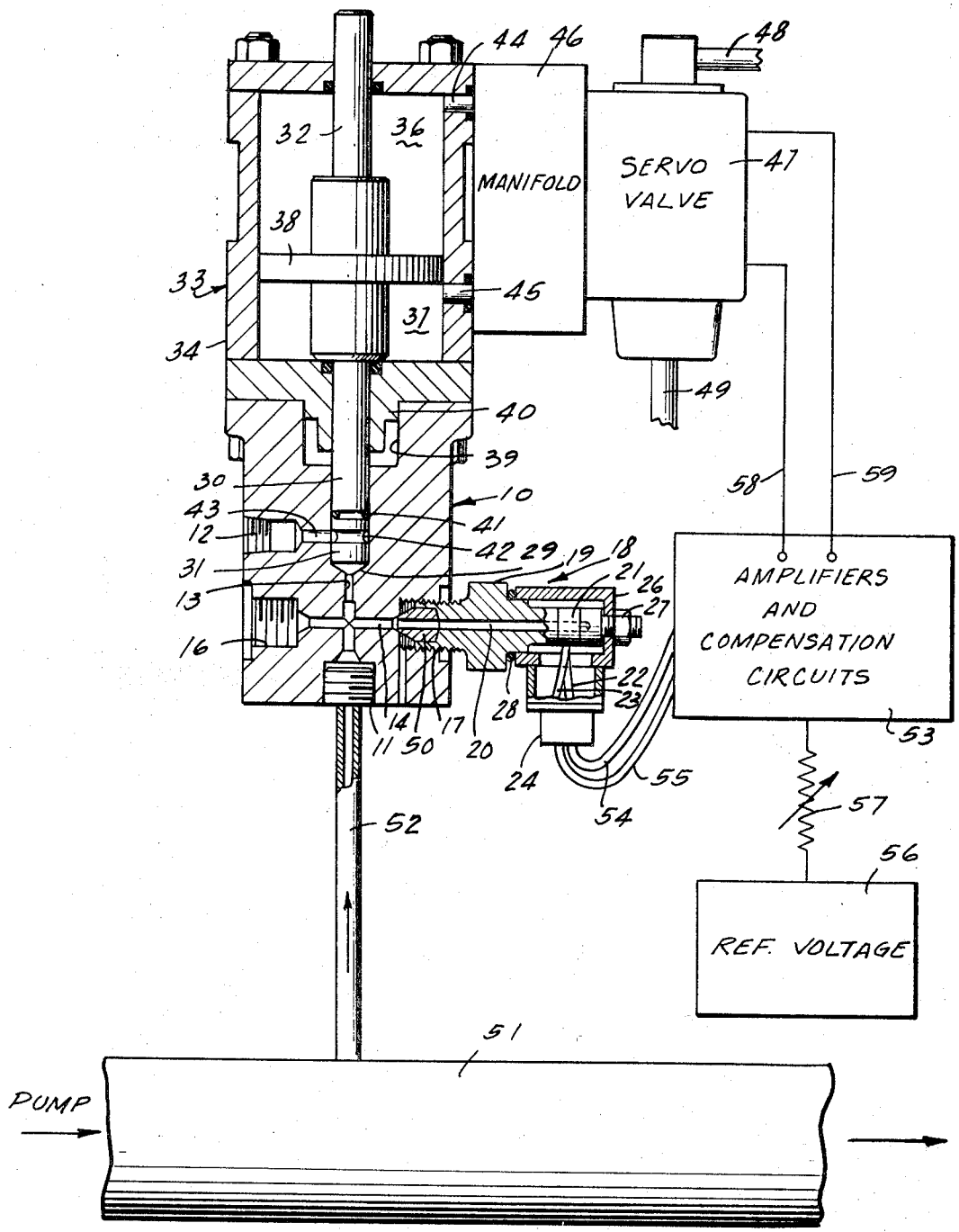

SERVO-CONTROLLED HIGH PRESSURE RELIEF VALVE

BACKGROUND OF THE INVENTION

1. Field of the Invention

This invention relates generally to a method and apparatus for adjustably controlling high pressure by the use of a pressure relief valve. Specifically, this invention is directed to a high-pressure relief valve wherein the relief pressure is adjustable without disassembling the valve and changing components therein.

2. Description of the Prior Art

Heretofore, pressure relief valves would include a valve seat and a valve head engageable therewith to be displaced from the seat in response to pressure exceeding a predetermined level so as to bleed off excess fluid thereby maintaining the pressure at the setting of relief valve. To change the relief pressure of the relief valves of the prior art, an adjusting screw is provided which changes the biasing force of a spring or similar component urging the valve head against the valve seat to change the relief pressure characteristics of the valve. However, relief valve of the prior art accurately adjustable only at relatively low pressures and, therefore, do not operate satisfactorily at high pressures.

SUMMARY OF THE INVENTION

Accordingly, one of the primary objects of the present invention is to provide a continuously adjustable relief valve system which provides accurate adjustability at high pressures.

Another object of the present invention is to provide a high-pressure relief valve control system which is simple in operation, inexpensive to manufacture and reliable in operation.

Briefly, the relief valve system of the present invention includes a servocontrolled conical valve which uses pressure feedback so that the device operates as a pressure relief valve. The device consists of a pressure transducer to sense the pressure at the inlet of the a valve, an amplifier and balance control circuit, an adjustable voltage reference source to preset the pressure, and a servovalve and hydraulic power amplifier to control fluid flow to a hydraulic cylinder which operates the pressure relief valve. The pressure relief control system operates by comparing the pressure transducer output voltage with the adjustable reference voltage. The difference in voltage levels is amplified and used to control the servovalve and hydraulic amplifier. Increases in pressure reduce the force supplied to the hydraulic cylinder by the servovalve thereby allowing the conical valve to open only when the inlet pressure exceeds the desired level of pressure. Pressure which is less than the preset pressure causes the conical valve to be seated tightly by the hydraulic cylinder thereby allowing the pressure in the fluid pressure system to build up to the preset level.

Other objects, features and advantages will be more fully realized and understood from the following detailed description when taken in conjunction with the accompanying drawing.

BRIEF DESCRIPTION OF THE DRAWING

The drawing shows a high-pressure relief valve in elevational sectional view and the associated component circuitry in block diagram form.

DESCRIPTION OF THE PREFERRED EMBODIMENT

As seen on the drawing, the fluid pressure control system of the present invention includes a pressure relief valve which includes a valve body indicated generally by reference numeral 10. The valve body has an inlet port 11 and an outlet port 12 formed therein for receiving threaded connections to suitable piping or conduit means. A fluid passage 13 is formed within the valve body 10 between the inlet 11 and outlet 12.

Also formed within the valve body 10 is a second fluid passage 14 which extends transversely to the fluid passage 13 and terminates at a pair of outlet ports 16 and 17. The outlet port 16 may receive a fluid pressure gage to give visual indication of the fluid pressure at the inlet port 11. The port 17 receives a fluid pressure transducer 18 which develops electrical signal information indicative of the fluid pressure at the inlet port 11. The valve body 10 may have several inlet ports formed therein for connection to various fluid supply or fluid receiving devices. The ports not used are plugged during operation.

The fluid pressure transducer 18 includes a threaded body portion 19 which threadedly engages the port 17. The body portion 19 has a channel 20 formed therein and extending partially through the body portion and in alignment with the transverse fluid passage 14. Fluid pressure at the inlet port 11 is also transmitted through the channel 20 such that a strain gage 21 senses the pressure. The strain gage 21 is secured to the exterior surface of the body portion 19 and over a portion of the channel 20 such that fluid pressure within the channel 20 causes a slight expansion of the body portion 19 thereby causing a dimensional change in the strain gage 21. The strain gage 21 develops an electrical signal which is delivered through a pair of leads 22 and 23 to an electrical plug receptacle 24.

Positioned over a portion of the body 19 and over the strain gage 21 is a cover 26 which is secured thereto by a nut 27. Positioned between the cover 26 and the body 19 is a seal 28 which prevents dirt and other contaminates from entering the cover 26 thereby maintaining the strain gage 21 in a clean atmosphere.

The fluid passage 14 has a valve seat 29 formed in a portion thereof. A valve shaft 30 extends through the valve body 10 and includes a valve head 31 which engages the valve seat 29 to control the flow of fluid through the passage 13 which, in turn, controls the flow of fluid from the inlet 11 to the outlet 12. The valve shaft 30 has an extended end 32 which extends from the valve body 10 and forms an integral part of a hydraulic cylinder assembly 33.

The hydraulic cylinder assembly 33 includes a housing 34 which defines a pair of fluid receiving chambers 36 and 37. Secured to the extended end 32 of the valve shaft 30 is a piston 38 which defines mutual movement wall portions for each of the chambers 36 and 37. The position of the valve head 31 relative to the valve seat 29 is controlled by the actuation of the piston 38 of the hydraulic cylinder assembly 33.

To facilitate assembly of the hydraulic cylinder 33 to the valve body 10, the valve body 10 is provided with an annular recess 39 which has the central axis thereof in alignment with the axis of the valve shaft 30. The housing 34 of the hydraulic cylinder 33 includes a boss 40 of annular configuration which engages the annular recess 39. Therefore, the hydraulic cylinder 33 can be quickly and easily assembled to the valve body 10 and in exact alignment therewith without the use of special tools or aligning equipment.

Positioned about the valve shaft 30 is an O-ring 41 which provides a fluid seal between the shaft and the interior surface the housing 10. The valve head 31 is provided with an undercut portion 42 which is in alignment with a fluid passage 43 extending from the outlet 12 when the valve head 31 is engaged with the valve seat 29. The fluid passages 13 and 43 may be considered a single fluid passage having a valve seat formed therein to separate the two portions of the passage.

The hydraulic cylinder assembly 33 is provided with a pair of fluid receiving ports 44 and 45 which are in fluid communication with chambers 36 and 37 respectively. Hydraulic fluid is delivered to the chambers 36 and 37 by means of a manifold 46 which, in turn, receives hydraulic fluid from a servovalve 47. The servovalve 47 receives hydraulic fluid from an inlet connection 48 and discharges hydraulic fluid to an outlet connection 49. The piston 38 and, therefore, the valve head 31 is displaced within the hydraulic cylinder assembly 33 by increasing the amount of hydraulic fluid delivered to the chamber 37 and decreasing the amount of hydraulic fluid in the chamber 36. This is accomplished by electrical signal information applied to the servovalve 47.

The valve head 31 may have a diameter less than the maximum diameter of the shaft 30 and accordingly less than the internal diameter of the aperture in the valve body 10 receiving the shaft. This will enable fluid to pass the head 31 and exit through the outlet 12. It will be understood that the valve head 31 may be provided with longitudinal serrations which also provide means for allowing fluid to pass from the valve seat 29 to the outlet 12. To insure a fluid tight seat between the transducer 18 and the transverse channel 14, a fitting 50 may be formed at the end of the transducer which has a tapered surface to engage a corresponding tapered seat portion at the end of the fluid passage 14.

When the pressure regulator check valve assembly of the present invention is used to control the pressure of a supply line, the inlet 11 is connected to a supply line 51 via a take off conduit 52. When fluid pressure within the supply line 51 is less than a predetermined value, the valve head 31 tightly engages the valve seat 29 to prevent fluid from passing from the inlet 11 to the outlet 12. On the other hand, should the fluid pressure within the supply line 51 exceed the predetermined value, the valve head 31 is displaced from the valve seat 29 to bleed off or pass fluid from the inlet 11 to the outlet 12 thereby maintaining the pressure within the supply line 51 at the predetermined valve.

The fluid pressure at inlet 11 is sensed by the strain gage 21 and the electric signal information developed in response to the fluid pressure is applied to amplifiers and compensation circuits 53 via a pair of lead lines 54 and 55. A reference voltage source 56 is connected to amplifiers and compensation circuits 53 through a variable resistance element 57. The variable resistance element may be manually set to select the desired operating pressure of the relief valve assembly. The output voltage of the strain gage 21 is compared with the selected reference voltage of the reference source 56 by the amplifiers and compensation circuits 53. When the electrical signal of the strain gage 21 is different than the electrical signal from the reference voltage source 56, the amplifiers and compensation circuits 53 will develop a control voltage which is applied to the servovalve 47 via a pair of lines 58 and 59. Therefore, the servovalve is controlled in response to the sensed pressure at the inlet 11 by means of the pressure transducer 18.

Accordingly, the pressure relief valve assembly and system of the present invention provides means for quickly and easily adjusting the pressure relief level of high pressure fluids. The preferred range of operation of the valve of this invention is between, for example, 10,000 and 100,000 p.s.i. However, it will be understood that a relief valve constructed in accordance with the invention will operate at other pressures. In view of the foregoing detailed description, it will be understood that variations and modifications may be effected without departing from the spirit and scope of the novel concepts of this invention.

I claim:

1. A pressure regulator and relief valve, comprising: a valve body having inlet, outlet and pressure measuring ports, said inlet port being connectable to a source of fluid pressure; a fluid passage formed in said body connecting said inlet, outlet and pressure measuring ports; a valve seat formed in a portion of said fluid passage; a valve shaft having one end thereof extending from said valve body and the other end thereof having a valve head positioned in said valve body and engageable with said valve seat for controlling the flow of fluid from said inlet port to said outlet port; control means connected to said one end of said valve shaft for controlling the position of said valve head relative to said valve seat; a pressure transducer connected to said measuring port, said pressure transducer responsive to fluid pressure at said inlet port for generating electrical signal information as a function of fluid pressure; a reference voltage source for providing a predetermined reference voltage indicative of a desired pressure level at said inlet; and an amplifier and compensating circuit having input terminals connected to said pressure transducer and to said reference voltage source to compare said signal information with said reference voltage to generate a control voltage when said signal information is different from said reference voltage, said amplifier and compensating circuit including output terminals for receiving said control voltage, said output terminals being connected to said control means; whereby, variations in fluid pressure at said inlet port above the desired pressure level will cause said valve head to be moved from said valve seat and discharge fluid to said outlet port.

2. A pressure regulator and relief valve according to claim 1 further including selector means connected between said reference voltage source and said amplifier and compensating circuit for selecting the desired pressure at said inlet port.

3. A pressure regulator and relief valve according to claim 1 wherein said pressure transducer includes a strain gage.

4. A pressure regulator and relief valve according to claim 1 wherein said pressure transducer includes a plug threadedly engageable with said measuring port and having a fluid passage through the plug which is in fluid communication with said fluid passage in said valve body for receiving the same fluid pressure which is delivered to the inlet port.

5. A pressure regulator and relief valve according to claim 4 further including a strain gage positioned about the outer surface of said plug and over the fluid passage through said plug for sensing the fluid pressure within the passage.

6. A pressure regulator and relief valve according to claim 1 wherein said control means includes a hydraulic cylinder connected to said one end of said valve shaft, a hydraulic fluid manifold connected to said hydraulic cylinder; and a servovalve hydraulically connected to said manifold and electrically connected to said output terminals and responsive to said electrical control voltage to position said hydraulic cylinder thereby positioning said valve shaft to control the flow of fluid from said inlet port to said outlet port thereby regulating the pressure at said inlet port.